US012796719B2

(12) United States Patent
Kitamura et al.

(10) Patent No.: US 12,796,719 B2
(45) Date of Patent: Nov. 17, 2026

(54) MOLDED-FOOD PROCESSING COMPOSITION

(71) Applicant: Mitsubishi Corporation Life Sciences Limited, Tokyo (JP)

(72) Inventors: Shingo Kitamura, Tokyo (JP); Naoko Kishie, Tokyo (JP); Yusuke Matsuyama, Tokyo (JP)

(73) Assignee: Mitsubishi Corporation Life Sciences Limited, Tokyo (JP)

( * ) Notice: Subject to any disclaimer, the term of this patent is extended or adjusted under 35 U.S.C. 154(b) by 842 days.

(21) Appl. No.: 17/776,958

(22) PCT Filed: Nov. 18, 2020

(86) PCT No.: PCT/JP2020/043016

§ 371 (c)(1),
(2) Date: May 13, 2022

(87) PCT Pub. No.: WO2021/100766

PCT Pub. Date: May 27, 2021

(65) Prior Publication Data

US 2022/0400717 A1 Dec. 22, 2022

(30) Foreign Application Priority Data

Nov. 18, 2019 (JP) ................................ 2019-207976

(51) Int. Cl.
*A23L 13/60* (2016.01)
*A23L 13/40* (2023.01)

(52) U.S. Cl.
CPC ............ *A23L 13/60* (2016.08); *A23L 13/426* (2016.08)

(58) Field of Classification Search
None
See application file for complete search history.

(56) References Cited

U.S. PATENT DOCUMENTS 4,132,810 A * 1/1979 Knutson ................ A23L 13/67 426/802

FOREIGN PATENT DOCUMENTS

| | | |
|---|---|---|
| CA | 872186 | 6/1971 |
| EP | 0326294 | 8/1989 |

(Continued)

OTHER PUBLICATIONS

Definition of “Aqueous Solution”, Helmenstine, Aqueous Solution Definition in Chemistry, ThoughtCo., Sep. 10, 2019. <https://www.thoughtco.com/definition-of-aqueous-solution-604370> (Year: 2019).*

(Continued)

*Primary Examiner* — Erik Kashnikow
*Assistant Examiner* — Thanh H Nguyen
(74) *Attorney, Agent, or Firm* — EVAN LAW GROUP LLC

(57) ABSTRACT

An object of the present invention is to provide a molded food product obtained by molding and heat-treating a raw material for molded food products, wherein the molded food product has excellent binding property and water-holding property without necessarily using a phosphate salt or egg white. A raw material for a molded food product comprising: a composition for processing a molded food product comprising an aqueous dispersion or hydrosol of a thermocoagulable β-1,3-glucan such as curdlan and oil or fat; and a food material, is molded and heated to obtain the molded food product.

2 Claims, 2 Drawing Sheets

(56) References Cited

FOREIGN PATENT DOCUMENTS

| | | | | |
|---|---|---|---|---|
| EP | 0584948 | | | 3/1994 |
| JP | 0523143 | | | 2/1993 |
| JP | 09238653 | | | 9/1997 |
| JP | 2011142881 | A | * | 7/2011 |
| JP | 2019-083826 | | | 6/2019 |
| WO | 2014/020734 | | | 2/2014 |

OTHER PUBLICATIONS

International Search Report dated Jan. 26, 2021 for PCT application No. PCT/JP2020/043016.

Extended European Search Report dated Nov. 16, 2023 for European application No. 20891281.6. 8 pages.

* cited by examiner

[Fig. 1]
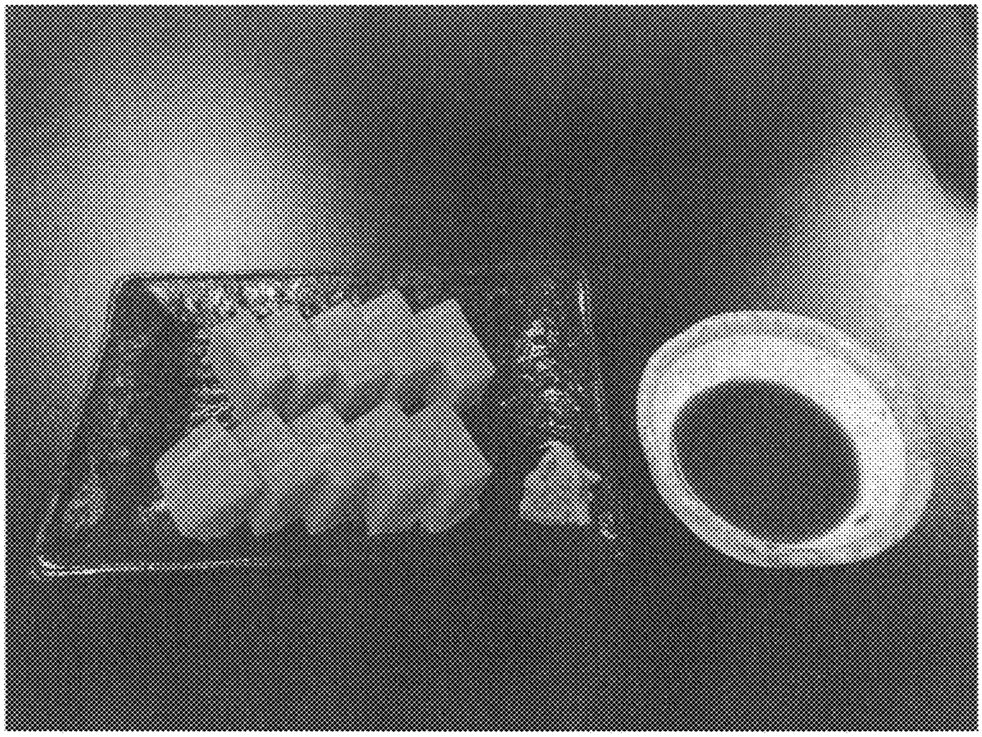

[Fig. 2]
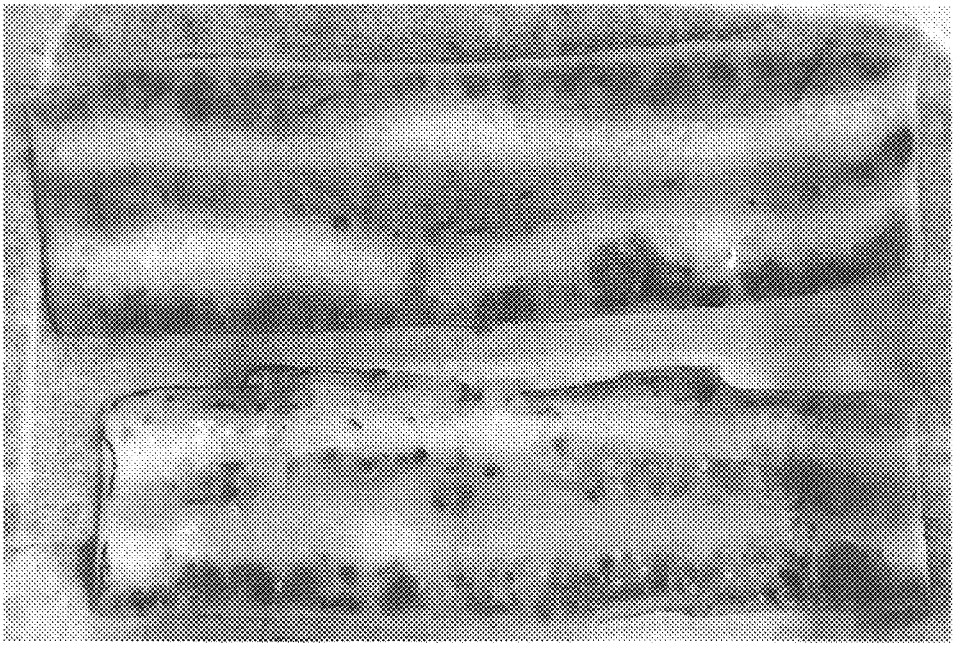

MOLDED-FOOD PROCESSING COMPOSITION

TECHNICAL FIELD

The present invention relates to a composition suitable for processing a molded food product such as a pasted product such as ham, sausage, hamburger steak, fish cake (kamaboko), chikuwa (tube-shaped fish paste cake), and fish-meat sausage; a raw material for molded food products using the composition; and a method for producing a molded food product using the raw material for molded food products.

BACKGROUND ART

Molded edible meat foods (edible meat-pasted product) such as ham and sausage and molded fish-meat foods (fish-meat-pasted product) such as fish cake, chikuwa, and fish-meat sausage are produced by adding a necessary material into edible meat or fish meat to be molded. Although such material is properly used as needed, in some cases a phosphate salt that is a food additive for enhancing binding capacity and water-holding capacity is used, besides table salt, protein, or the like.

In recent years, there has been a tendency to refrain from using a phosphate salt, and a demand for an alternative material for the phosphate salt has been increased among producers of molded food products. For example, known is an alternative composition for the phosphate salt for fish or livestock meat, containing: (a) 100 parts by weight of at least one selected from a starch, a vegetable protein, gelatin, egg white, lactose, and casein; (b) 10 to 60 parts by weight of at least one selected from sodium carbonate, sodium hydrogen carbonate, potassium carbonate, and potassium hydrogen carbonate, in terms of sodium carbonate; (c) 10 to 30 parts by weight of at least one selected from ascorbic acid, sodium ascorbate, and potassium ascorbate, in terms of ascorbic acid; and (d) 1 to 20 parts by weight of at least one selected from acetic acid, sodium acetate, and potassium acetate, in terms of acetic acid. It is described that use of these compositions enhances resilience of pasted products without a phosphate salt-based additive (see patent document 1).

Also known is a method for producing a processed poultry meat food, wherein arginine is added into fowl consisting of a single lump of meat to be heat-treated or dry-treated. It is described that use of this method improves water-holding property of chicken to exhibit moistness of fowl without a phosphate salt (see patent document 2).

On the other hand, in molded food products resembling a shape, food texture and the like of an edible meat-pasted product or a fish-meat-pasted product by using a vegetable protein or the like, when heat treatment is needed due to use of a material with weak binding capacity and water-holding capacity, egg white may be used as a material to compensate the binding capacity and the water-holding capacity. However, the effect is insufficient, and the alternative material therefor has been required from the viewpoint of allergy and the like.

For example, known is a method for producing a molded food product wherein curdlan dissolved in or swelled with an alkaline aqueous solution is added into grains or processed foods thereof to be bound and molded. It is described that a rice ball molded by using this producing method does not lose the shape and has preferable food texture even cooled comparing with a rice ball containing no curdlan or using a powdery curdlan (see patent document 3).

PRIOR ART DOCUMENTS

Patent Documents

Patent Document 1: Japanese unexamined Patent Application Publication No. 8-238073

Patent Document 2: Japanese unexamined Patent Application Publication No. 2011-193830

Patent Document 3: Japanese unexamined Patent Application Publication No. 10-155437

SUMMARY OF THE INVENTION

Object to be Solved by the Invention

As described above, some alternative methods for the phosphate salt are known. However, the composition of patent document 1, which has an effect of alternative for the phosphate salt, has a complex composition, and has a concern about an effect on a flavor depending on the used amount. The method of patent document 2 has the effect of alternative for the phosphate salt with the texture of edible poultry itself, but the effect is not expected to molded food products in which food materials are molded to be heat-treated. The method of cited document 3 has a concern about an effect of water-holding property.

An object of the present invention is to provide a means of improving a quality, particularly binding property between meat or binding property between vegetable proteins, and water-holding property, of molded food products obtained by molding and heat-treating edible meat or fish meat or of molded food products mimicking the shape, food texture and the like thereof by using a vegetable protein and the like.

Means to Solve the Object

The present inventors have made intensive investigation to solve the above problem, and as a result, found that by preparing in advance an aqueous dispersion or hydrosol of a thermocoagulable β-1,3-glucan, such as curdlan, and an oil or fat, and mixing with food materials, molded and heat-treated can yield molded food products having excellent binding property and water-holding property without necessarily using a phosphate salt, egg white, or the like, and have completed the present invention.

That is, the present invention is specified by items described below.

(1) A composition for processing a molded food product, comprising an aqueous dispersion or hydrosol of a thermocoagulable β-1,3-glucan and oil or fat.

(2) The composition for processing a molded food product according to (1), wherein the aqueous dispersion or the hydrosol further comprises one or more materials selected from the group consisting of a starch, an emulsifier, a powdery protein material, a cellulose, a calcium salt, a pigment, and a thickener.

(3) The composition for processing molded a food product according to (1) or (2), wherein the aqueous dispersion or the hydrosol is in paste form.

(4) A raw material for a molded food product, comprising: the composition for processing a molded food product according to any one of (1) to (3); and a food material.

(5) A method for producing a molded food product, comprising molding and heat-treating the composition for processing a molded food product according to any one of (1) to (3) or the raw material for molded food products according to (4).

(6) The method for producing a molded food product according to (5), further comprising, before the molding and the heat-treating, laminating a plurality of layers comprising a layer formed with the composition for processing a molded food product according to any one of (1) to (3) or the raw material for molded food products according to (4) to form a multilayer body.

(7) The method according to (5) or (6), wherein the molded food product is an edible meat-like food or a fish-meat-like food.

Effect of the Invention

Use of the composition for processing molded food products of the present invention can yield molded food products having excellent water-holding property and binding property without necessarily using a phosphate salt or egg white.

BRIEF DESCRIPTION OF DRAWINGS

FIG. 1 shows a sliced salmon-style food made from a composition for processing molded food products of the present invention (Example 4).

FIG. 2 shows a bacon-style food made from a composition for processing molded food products of the present invention (Example 5).

MODE OF CARRYING OUT THE INVENTION

A composition for processing molded food products of the present invention comprises an aqueous dispersion or hydrosol of a thermocoagulable β-1,3-glucan, such as curdlan, and oil or fat (hereinafter, referred to as "aqueous dispersion and the like"). The "aqueous dispersion" herein means a solution in which solid or liquid forms particles or droplets in an aqueous dispersion medium to be dispersed, and includes any of an aqueous solution, a suspension, an emulsion (emulsified liquid), and a suspoemulsion (emulsified suspension). The "hydrosol" herein means one in which solid or liquid forms fine particles or droplets in an aqueous dispersion medium to be dispersed (colloid-dispersed) and having fluidity. The hydrosol herein is a narrower concept whose broader concept is the aqueous dispersion, and included in the aqueous dispersion.

The dispersion and the like used in the present invention are referred to the following states, for example.

(1) Particles of the thermocoagulable β-1,3-glucan and particles and/or droplets of oil or fat form a dispersion or a suspoemulsion in the aqueous dispersion medium.

(2) Particles of the thermocoagulable β-1,3-glucan and particles and/or droplets of oil or fat form a colloid dispersion system in the aqueous dispersion medium to have fluidity.

(3) Fine particles of the thermocoagulable β-1,3-glucan form a colloid dispersion system in the aqueous dispersion medium, and particles or droplets of oil or fat form a suspension or an emulsion in this aqueous dispersion medium.

(4) Particles of the thermocoagulable β-1,3-glucan form a suspension in the aqueous dispersion medium, and fine particles or fine droplets of oil or fat form a colloid dispersion system in this aqueous dispersion medium.

Although the aqueous dispersion and the like preferably has a state where the particles of the thermocoagulable β-1,3-glucan and the particles and/or droplets of oil or fat are stably dispersed in the aqueous dispersion medium, the aqueous dispersion and the like is acceptable as long as it is dispersed by stirring or mixing during use thereof, and the particles of the thermocoagulable β-1,3-glucan and the particles and/or droplets of oil or fat may be precipitated or separated during storage. In the aqueous dispersion medium, a hydrophilic organic solvent such as an alcohol can be used as a part thereof in accordance with necessity.

The thermocoagulable β-1,3-glucan used in the producing method of the present invention is not particularly limited as long as its constituent saccharide is D-glucose, it is mainly constituted with β-1,3-glucoside bonds, and it is a polysaccharide having thermocoagulable property. Examples thereof can include curdlan, paramylon, and pachyman, and of these, curdlan can be preferably exemplified. Examples of such curdlan include a product by a microorganism of the genus *Alcaligenes* or the genus *Agrobacterium*. Specifically, curdlan produced by *Alcaligenes faecalis* var. *myxogenes* strain 10C3K [Agricultural Biological Chemistry, volume 30, p. 196 (1966)], curdlan produced by NTK-u (IFO13140), which is mutant strain of *Alcaligenes faecalis* var. *myxogenes* strain 10C3K (Japanese Patent Application Publication No. 48-32673), curdlan produced by *Agrobacterium radiobacter* (IFO13127) and mutant strain thereof U-19 (IFO13126) (Japanese Patent Application Publication No. 48-32674), and the like can be used. A commercially available curdlan (for example, manufactured by Mitsubishi Corporation Life Sciences Limited) can also be used.

The oil or fat used in the present invention may be any of vegetable oil or fat or animal oil or fat as long as it is edible. Examples thereof include a triglyceride such as: vegetable oil or fat such as cottonseed oil, soybean oil, rapeseed oil, palm oil, and olive oil, and animal oil or fat such as beef tallow and lard; and a fatty acid and a diglyceride obtained therefrom. A refined oil and a refined fatty acid separated and refined therefrom may also be used. These oils and fats can be used singly or in combination of two or more.

The aqueous dispersion and the like used in the present invention can be prepared by, for example, using the following (i) to (iv) methods when the thermocoagulable β-1,3-glucan is curdlan.

(i) Water is added into curdlan to be mixed by using a high-speed stirrer such as a homogenizer and a cutter mixer until a viscous liquid is obtained.

(ii) Water is added into curdlan to be homogenized by using a high-speed stirrer such as a homogenizer and a cutter mixer, the dispersion is heated to approximately 50 to 60° C., and then cooled to 40° C. or lower.

(iii) Curdlan is dispersed in water at normal temperature, hot water is added thereinto to instantaneously regulate the temperature to approximately 50 to 60° C., and then cooled to 40° C. or lower.

(iv) An aqueous dispersion of curdlan is adjusted to be strong alkali, a pH of 10.5 or higher (pH of 11 to 12) to dissolve the curdlan, an acid is added into this liquid for adjusting the pH to be 5 to 9 to precipitate the curdlan as particles or fine particles, resulting in the suspension or the hydrosol.

Next, the aqueous dispersion and the like of the thermocoagulable β-1,3-glucan prepared with the above (i) to (iv) methods is stirred at high speed with a homogenizer, a cutter mixer, or the like. With the stirring, oil or fat, or oil or fat and an emulsifier according to need are added to prepare the aqueous dispersion and the like as an emulsion, a suspoemulsion, or a colloid dispersion system. The emulsifier is not particularly limited as long as it is edible and capable of emulsifying the oil or fat in water, and examples thereof include: a liquid yolk such as a raw liquid yolk, a sterilized liquid yolk, and a lysed yolk; a lecithin such as lecithin and lysolecithin; an emulsifiable starch such as a starch octenyl succinate; a glycerol fatty acid ester; a polyglycerol fatty acid ester; a sucrose fatty acid ester; and a sorbitol fatty acid ester. A content of the emulsifier is preferably 0.10 to 10 mass %, more preferably 0.5 to 8 mass %, and further preferably 2 to 6 mass %, based on a total mass of water and the oil or fat in the aqueous dispersion and the like.

The aqueous dispersion and the like obtained as above is then preferably pasted. The pasting can be performed by mechanically applying shear force, pressure, or the like to the aqueous dispersion and the like. A method using a mixer having a high-speed rotary blade and the like is applied, but not particularly limited thereto.

A content ratio of the thermocoagulable β-1,3-glucan and the oil or fat contained in the aqueous dispersion and the like used for the present invention is not particularly limited, and a person skilled in the art can appropriately determine the ratio in view of the appearance, taste, flavor, food texture and the like (hereinafter, referred to as "food texture and the like") required for the finally obtained molded food product.

For example, a content of the oil or fat in the aqueous dispersion and the like is preferably within a range of 1 to 90 mass %, 1 to 85 mass %, or 1 to 40 mass %, and more preferably within a range of 3 to 30 weight %, based on the water contained in the aqueous dispersion and the like. For example, a content of the thermocoagulable β-1,3-glucan in the aqueous dispersion and the like is preferably within a range of 0.5 to 30 mass %, 0.5 to 25 mass %, or 0.5 to 10 mass %, and more preferably within a range of 0.5 to 5 mass %, based on the water contained in the aqueous dispersion and the like.

The aqueous dispersion and the like used for the present invention can appropriately comprise at least one or more materials (additives) selected from the group consisting of a starch, an emulsifier, a powdery protein material, a cellulose, a calcium salt, a pigment, and a thickener.

Specific examples of the starch include a tapioca starch, a potato starch, a corn starch, a waxy corn starch, a wheat starch, a rice starch, a sweet potato starch, or a processed starch (comprising indigestible starch) of crosslinked, esterified, etherified, oxidized, or pregelatinized starch thereof. These can be used alone or in combination of two or more. A mixed amount of the starch is not particularly limited, and for example, preferably within a range of 1 to 15 mass %, and further, preferably within a range of 2 to 10 mass %, based on the entire mass of the water and the oil or fat in the aqueous dispersion and the like.

Specific examples of the emulsifier include a glycerol fatty acid ester, an organic acid monoglyceride, a polyglycerol fatty acid ester, a propylene glycol fatty acid ester, a polyglycerol interesterified ricinolic acid ester, a sorbitol fatty acid ester, a sucrose fatty acid ester, a lecithin, and an enzymolyzed lecithin. These can be used alone or in combination of two or more. A mixed amount of the emulsifier is not particularly limited, and for example, preferably within a range of 0.1 to 1.0 mass %, and further preferably within a range of 0.2 to 0.8 mass %, based on the entire mass of the water and the oil or fat in the aqueous dispersion and the like.

Specific examples of the powdery protein material include a powdery product of a protein such as: an egg protein such as a whole egg, a yolk, an egg white, and an ovalbumin and an ovoglobulin separated therefrom; a milk protein such as a skim-milk powder, a whole milk powder, a whey protein; an animal protein such as gelatin and collagen; and a vegetable protein such as a soybean protein and a wheat protein. These can be used alone or in combination of two or more. A mixed amount of the powdery protein material is not particularly limited, and for example, preferably within a range of 5 to 30 mass %, and further, preferably within a range of 8 to 20 mass %, based on the entire mass of the water and the oil or fat in the aqueous dispersion and the like.

Examples of the cellulose include a cellulose obtained from vegetation or a microorganism, and more specific examples thereof include a powdery cellulose, a fermented cellulose, a crystalline cellulose, a fine-crystalline cellulose, and a fine-fabric cellulose that are obtained by mechanically or chemically treating wood pulp. These can be used singly or in combination of two or more. A mixed amount of the cellulose is not particularly limited, and preferably within a range of 0.5 to 10 mass %, and further preferably within a range of 1 to 5 mass % or 2 to 3 mass %, based on the entire aqueous dispersion and the like.

The calcium salt has not particular limitation as long as it can be used for food use regardless of its solubility in water, and specific examples thereof include calcium chloride, calcium carbonate, tricalcium phosphate, calcium monohydrogen phosphate, calcium dihydrogen phosphate, calcium sulfate, calcium gluconate, calcium citrate, and calcium lactate. A mixed amount of the calcium salt is not particularly limited, and preferably within a range of 0.5 to 10 mass %, and further preferably within a range of 1 to 5 mass % or 2 to 3 mass %, based on the entire aqueous dispersion and the like.

The pigment is not particularly limited as long as it is approved for a food additive and suitable for the target tint, and specific examples thereof include: a tar-based edible pigment such as Food Red No. 2, Food Red No. 3, Food Red No. 40, Food Red No. 102, Food Red No. 104, Food Red No. 105, Food Red No. 106, Food Yellow No. 4, Food Yellow No. 5, Food Green No. 3, Food Blue No. 1, and Food Blue No. 2; an inorganic specified pigment such as iron sesquioxide and titanium dioxide; and a pigment derived from a natural origin such as carotenoid pigment, a carotenocide pigment, a *curcuma* pigment, a caramel pigment, a *gardenia* pigment, copper chlorophyll, sodium copper-chlorophyllin, a monascus pigment, and a safflower pigment. In addition, calcium carbonate, calcium chloride, calcium hydroxide, copper sulfate, ferrous sulfate, magnesium chloride, potassium carbonate, potassium chloride, potassium hydroxide, sodium hydrogen carbonate, sodium carbonate, sodium hydroxide, sodium nitrite, zinc sulfate, and the like that are used as a food additive can be used according to their colors of solid. A mixed amount of the pigment is not particularly limited, and preferably within a range of 0.01 to 5 mass %, and further preferably within a range of 0.05 to 3 mass % or 0.1 to 1.5 mass %, based on the entire aqueous dispersion and the like.

Specific examples of the thickener (also referred to as a gelling agent, a stabilizer, a thickening stabilizer, or a paste material) include locust bean gum, κ-carrageenan, L-carrageenan, λ-carrageenan, carrageenan, gelatin, low methoxyl pectin, high methoxyl pectin, pectin, tara gam, agar, low strength agar, gellan gum, guar gum, xanthan gum, tamarind gum, and hydroxypropyl methylcellulose. These can be used alone or in combination of two or more. A mixed amount of the thickener is not particularly limited, and for example, preferably within a range of 0.5 to 10 mass %, and more preferably within a range of 0.5 to 5 mass %, based on the entire mass of the water and the oil or fat in the aqueous dispersion and the like.

With the composition for processing molded food products of the present invention, various additives can be further mixed for a purpose of adjusting food texture and the like in accordance with necessity. Examples thereof include a salt (such as a glutamate salt, a citrate salt, a gluconate salt, and a carbonate salt), a protein (such as a milky protein, a soybean protein, an egg protein, and a wheat protein), an amino acid, an enzyme (such as transglutaminase and protease), a carbohydrate, and a dietary fiber. Furthermore, examples thereof include one or more components selected from an emulsifier, a milk protein, gelatin, and an egg white for adjusting food textures such as juiciness, flexibility, chewiness, resilience, and smoothness through a throat.

The additive may be added into water together with the thermocoagulable β-1,3-glucan during preparation of the aqueous dispersion and the like of the thermocoagulable β-1,3-glucan. After the preparation of the aqueous dispersion and the like of the thermocoagulable β-1,3-glucan, the additive may be added into this aqueous dispersion and the like of the thermocoagulable β-1,3-glucan to be mixed and stirred. In addition, after the oil or fat is added into this aqueous dispersion and the like of the thermocoagulable β-1,3-glucan to prepare an emulsion, the additive may be added to be mixed and stirred. Each additive is not necessarily added at the same time wholly. Each additive can be gradually added and mixed and stirred in accordance with necessity to prepare the aqueous dispersion and the like.

The raw material for molded food products of the present invention comprises: a food material; and the composition for processing molded food products. A content of the composition for processing molded food products in the raw material for molded food products is preferably within a range of 1 to 100 mass %, 1 to 90 mass %, 1 to 80 mass %, or 1 to 40 mass %, and further preferably within a range of 2 to 30 mass % or within a range of 5 to 25 mass %, based on a mass of the entire raw material for molded food products. When the molded food product is a hamburger steak-like food as one embodiment, the content is preferably within a range of 10 to 30 mass %, 15 to 25 mass %, or 20 to 25 mass %. When the molded food product is a hamburger steak as one embodiment, the content is preferably within a range of 5 to 20 mass %, 10 to 20 mass %, or 10 to 15 mass %. When the molded food product is ham as one embodiment, the content is preferably within a range of 0.5 to 20 mass %, 1 to 10 mass %, or 1 to 5 mass %. When the molded food product is a sliced fish-style food as one embodiment, the content is preferably within a range of 60 to 100 mass %, 80 to 100 mass %, or 90 to 100 mass %. When the molded food product is a bacon-style food as one embodiment, the content is preferably within a range of 60 to 100 mass %, 80 to 100 mass %, or 90 to 100 mass %. The food material is referred to a food material widely applied to various manufacture and development of foods, and specific examples thereof include edible meat and fish meat.

Examples of the edible meat include beef, pork, mutton and lamb, horsemeat, chicken, venison, wild boar meat, bear meat, and whale meat. Examples of the fish meat include meat of fishes such as walleye pollack, Atka mackerel, horse mackerel, sardine, red bigeye, golden threadfin bream, silver white croaker, cutlass fish, conger pike, spotted shark, blue shark, deep-sea porgy, and black marlin.

A food material other than the edible meat and the fish meat is not particularly limited as long as it is a food material that a human or the like can eat. Example thereof include: a vegetable material of seeds or the like of, such as, carrot, plant of the genus *Oryza*, plant of the genus *Triticum*, plant of the genus *Hordeum*, and a plant of the genus *Avena*; a seafood such as squid, a crustacean such as shrimp and crab, and a shellfish such as scallop. In addition, examples of the food material include a processed food thereof into canned foods, boiled plains, retort pouches, or the like, and a processed food thereof into cooked dishes, hamburger steak, grilled chicken, or the like.

The food material comprises a protein constituting an animal body (hereinafter, referred to as "animal protein") and a protein constituting a plant body (hereinafter, referred to as "vegetable protein"). Examples of the animal protein include: silk fibroin of silk thread; collagen of bones, tendons, and the like; keratin of hair, and egg albumin of egg white.

The vegetable protein is not derived from animals and is a material having the structure, texture, and/or other characteristics similar to animal meat. Examples thereof include a vegetable protein, a powdery vegetable protein, a pasted vegetable protein, a particulate vegetable protein, and a fabric vegetable protein that are specified in Japanese Agricultural Standard (JAS), and a protein similar thereto. Examples of the protein similar thereto include a vegetable protein having a shape of lump, bar, dice, or muscle. Any of them has more than 50 mass % of a vegetable protein content rate measured with a Kjeldahl method.

Specific examples of types of the vegetable protein material may include a pea protein and a canola protein as well as a soybean protein and a wheat protein that are specified in JAS, and among them, preferably a soybean protein. Examples of the soybean protein may include the above soybean protein specified in JAS, and further, a defatted soybean in which whole soybeans or the likes are defatted by an organic solvent such as hexane or ethanol; soybean milk in which a protein is extracted from this defatted soybean with water; and a separated soybean protein obtained from the soybean milk with a method such as an acid precipitation or alcohol precipitation, and a condensed soybean protein.

To provide a food that has a low bulk density, that is softer than conventional ones, that has good flavor, and that is easy to eat, the above vegetable protein also include a processed vegetable protein such as "a particulate vegetable protein material that contains 40 to 70 weight % at a dry weight of a vegetable protein, that has a hardness with wetting of 2000 to 6000 g, and that is produced by adding one or more emulsifiers selected from organic acid monoglycerides having an HLB of 5 to 10 into a raw material" proposed in International Publication No. 2015/029555.

Furthermore, the above vegetable proteins also include an organized soybean protein, so-called soybean meat (soy meat). Examples of the organized soybean protein include an organized soybean protein in which soybeans are processed to increase a protein content to 50 weight % or more, and include a soybean protein other than the particulate protein and the fibric protein that are specified in JAS.

As the above vegetable protein, a particulate vegetable protein is particularly preferable. The particulate vegetable protein is referred to, for example, a vegetable protein in which a defatted soybean, a condensed soybean protein, a separated soybean protein, gluten, a pasted wheat protein, or the like are organizing-processed into a particulate or flake shape by using a one-screw or two-screw extruder or the like.

Examples of a food material other than the above food material include water, a vegetable, a fruit, a seaweed, a seasoning, a spice, and a colorant. The vegetable is not particularly limited as long as it satisfies the food texture and the like of the molded food product, and examples thereof include an onion, a carrot, and a green pepper. The seasoning is also not particularly limited as long as it satisfies the food texture and the like of the molded food product, and examples thereof include a garlic, a ginger, a capsicum, pepper, soy sauce, and miso.

The food materials can be used singly or by mixing two or more. A property of each food material is not particularly limited as long as it has a moldable property, and may be any of solid, liquid, and semisolid. The property may also be a dry state, and is particularly preferably powdery or particulate. Examples thereof include minced edible meat with finely cutting or grinding meat, paste with finely cutting or grinding fish meat or seafood, flour with grinding seeds of wheat, and a particulate soybean protein in which a defatted soybean protein is organizing-processed.

The above composition for processing molded food products is mixed with the above food material to form the raw material for molded food products, and this raw material for molded food products can contain an oil-or-fat-containing thermocoagulable β-1,3-glucan gel. The oil-or-fat-containing thermocoagulable β-1,3-glucan gel can be obtained by, for example, degassing the aqueous dispersion and the like prepared as above to be heated to 80° C. or higher. A method of degassing the aqueous dispersion and the like is not particularly limited, and the degassing can be performed by, for example, filling a container and using a known degassing apparatus.

A method of heating the aqueous dispersion and the like degassed as above is not particularly limited. Examples thereof include boil heating, steam heating, pressure heating, and electric heating, and is preferably steam heating. The heating condition is not particularly limited as long as it allows the thermocoagulable β-1,3-glucan to form a thermo-irreversible gel, and appropriately determined by a person skilled in the art. The temperature is preferably 80° C. or higher, more preferably 80 to 120° C., and further preferably 85 to 100° C. A heating time is preferably 5 minutes or longer, more preferably 5 to 90 minutes, and further preferably 15 to 60 minutes.

Although the oil-or-fat-containing thermocoagulable β-1,3-glucan gel obtained as above can be used as it is, the gel is preferably crushed for forming particles or powder to be used. Into the oil-or-fat-containing thermocoagulable β-1,3-glucan gel obtained as above, a seasoning, a spice, a thickener, a starch, a colorant, and another vegetable or animal protein and the like (hereinafter, referred to as a seasoning and the like) can be added in accordance with necessity. Specific examples thereof can include one similar to one exemplified in the composition for processing molded food products of the present invention and in the food material.

The seasoning and the like may be added into the above particulate or powdery oil-or-fat-containing thermocoagulable β-1,3-glucan gel. The seasoning and the like may be mixed into water together with the thermocoagulable β-1,3-glucan during preparation of the aqueous dispersion and the like of the thermocoagulable β-1,3-glucan. After the preparation of the aqueous dispersion and the like of the thermocoagulable β-1,3-glucan, the seasoning and the like may be added into this aqueous dispersion and the like of the thermocoagulable β-1,3-glucan to be mixed and stirred. In addition, oil or fat is added into this aqueous dispersion and the like of the thermocoagulable β-1,3-glucan to prepare an emulsion, and the seasoning and the like may be added to be mixed and stirred. The seasoning and the like are not necessarily added at the same time wholly, and can be appropriately added to be mixed and stirred in accordance with necessity to prepare the aqueous dispersion and the like.

A method of mixing the edible meat, the fish meat, the other food material, the composition for processing molded food products of the present invention, the oil-or-fat-containing thermocoagulable β-1,3-glucan gel, and the like to prepare the raw material for molded food products is not particularly limited as long as it is a method that can mix each component, and preferably it is a method that can uniformly mix each component. Specific examples thereof include stirring and mixing method in a mixing vessel equipped with a stirring blade such as a disk turbine blade, an inclined paddle blade, an anchor blade, and a helical ribbon blade. Particularly preferable examples of the mixing vessel include a ribbon mixer equipped with a helical ribbon blade, and its shape may be horizontal or vertical. When the gel is finely mixed, a cutter mixer, a silent mixer, and a ball cutter can be used.

The composition for processing molded food products or raw material for molded food products prepared as above is molded and heat-treated to yield the molded food product. A method of molding the raw material for molded food products can be freely selected in accordance with a shape of the molded food product to be produced. For example, when the molded food product is sausage, the prepared raw material for molded food products is filled in an edible collagen casing to achieve the molding. When the molded food product is hamburger steak, the raw material for molded food products is formed in an oval shape to achieve the molding. Although the molding may be performed by hand, the molding may also be performed by using a food molding machine that can automatically fill a mold to perform the molding. The raw material for molded food products may be put in a packaging bag or a container to seal this, and may be sealed and then heat-treated to be a molded food product. Furthermore, the obtained molded food product may be frozen with sealing.

A method of heat-treating the raw material for molded food products molded as above is not particularly limited. Examples thereof include boil heating, steam heating, pressure heating, and electric heating, and is preferably steam heating. A heating condition is not particularly limited as long as it allows the aqueous dispersion and the like in the raw material for molded food products to form a thermo-irreversible gel, and appropriately determined by a person skilled in the art. The temperature is preferably 80° C. or higher, more preferably 80 to 120° C., and further preferably 85 to 100° C. The heating time is preferably 5 minutes or longer, more preferably 5 to 90 minutes, and further preferably 15 to 60 minutes. Although depending on the food, the surface after heating can be grilled when a browned surface is preferable as appearance of the food. The molded food product obtained by heating and grilling, in accordance with necessity, the raw material for molded food products can be frozen after packaged.

Before the molding and heat-treating as above, a step of laminating a plurality of layers comprising a layer formed with the composition for processing molded food products or the raw material for molded food products to form a multilayer body may be further comprised. A method of preparing the multilayer body is not particularly limited, and examples thereof include: a method in which the composition for processing molded food products or the raw material for molded food products is poured into a heat-resistant mold to mold a layer 1, another composition for processing molded food products or raw material for molded food products is poured on the layer 1 to form a layer 2, and this procedure is repeated to prepare the multilayer body; and a method in which the composition for processing molded food products or the raw material for molded food products is poured into a mold to mold a layer 1, another composition for processing molded food products or raw material for molded food products is poured under the layer through a pipe to mold a layer 2 under the layer 1, another composition for processing molded food products or raw material for molded food products is poured under the layer 2 through a pipe to mold a layer 3, and this procedure is repeated to prepare the multilayer body. A thickness of the layer can be appropriately set in accordance with purpose.

A shape and form, and size of the molded food product produced as above are not particularly limited, and specific examples thereof include spherical, hemispherical, cubic, rectangular parallelepiped, polyhedral, oval, gourd-shaped, columnar, plate, bar, conical, triangular pyramidal, and quadrangular or pyramidal, having a size easily ingested orally once or in several divided portions by humans.

The molded food product is not particularly limited as long as it is an edible product in which the raw material for molded food products is molded in a certain shape. Examples thereof include: a molded food product utilizing edible meat such as ham, hamburger steak, meat ball, gyoza, sausage, salami, and nugget; and a molded food product utilizing seafood such as steamed kamaboko, grilled kamaboko, tubular kamaboko, hanpen (boiled fish paste), tsumire (boiled fishcake), satsuma-age (fried fishcake), and fish-meat sausage. Particularly preferable examples thereof include: an edible-meat-pasted product, which is a food in which edible meat as a main raw material is kneaded with added table salt and a seasoning and then molded and heat-treated; and a fish-meat-pasted product, which is a food in which fish meat as a main raw material is kneaded with added table salt and a seasoning and then molded and heat-treated. Examples of the edible meat-pasted product include ham, sausage, and hamburger steak, and examples of the fish-meat-pasted product include kamaboko, tubular kamaboko, and fish-meat sausage. In addition to the above molded food products, examples of the molded food product include: a molded food product utilizing a plant seed such as tofu, udon, soba, pasta, somen, and rice flour noodle; a molded food product utilizing a plant such as dried layer seaweed; and a molded food product utilizing a dairy product such as cheese. Furthermore, the present invention can be applied to an edible meat-like food, a fish-meat-like food, and the like in which edible meat or fish meat of the animal protein in the above molded food products is substituted with a vegetable protein. Specific examples of the edible meat-like food and the fish-meat like food include: an edible meat-like food such as bacon, ham, and roasted pork fillet in which a lean portion is substituted with an aqueous dispersion using a vegetable protein or the like and a fat portion is substituted with an aqueous dispersion using a vegetable oil or the like; or a fish-meat-like food such as tuna and salmon (such as, for example, a sliced fish-style food) in which a lean portion is substituted with an aqueous dispersion using a vegetable protein or the like and a fibric portion is substituted with mixed powder or the like of curdlan and a pigment.

The composition for processing molded food products of the present invention is mixed with edible meat, fish meat, or another food material to obtain the raw material for molded food products. In the molded food product obtained by molding and heat-treating the raw material for molded food products, the composition for processing molded food products improves binding effect between the food materials to enable to impart high chewiness and resiliency and to impart juiciness, moistness, and the like to the molded food product, or, in the molded food product, enable to maintain and not to lose juiciness, moistness, and the like that the food material originally has even with the heat treatment. In particular, when the powdery or particulate food material such as the minced meat and the paste is molded to be the molded food product, the composition for processing molded food products of the present invention exhibits particularly excellent binding effect and water-holding effect, which can produce the molded food product having excellent food texture.

Evaluation of the binding property can be evaluated with, for example, chewiness and resiliency of the food. The chewiness of the food can be evaluated with a hardness of the food as an index. The hardness of the food can be determined by, for example, measuring a maximum testing force of a target food by using a texture analyzer to calculate the hardness of the food based on the maximum testing force. The resilience of the food can be evaluated by, for example, applying a load to a target food by using a rheometer to evaluate a stress (rupture stress) and percent deformation (rupture strain) when the target food is ruptured. Evaluation of the water-holding property can be evaluated by measuring weights of the raw material for molded food products before heating and after heating then allowed to cool to evaluate a yield determined by the following formula as an index:

$$\text{Yield }(\%)=B/A\times 100$$

A: Mass (g) of Food Raw Material before Heating
B: Mass (g) of Molded Food Product after Heating then Allowed to Cool Determining the heating yield can evaluate an amount of moisture content, oil content, and the like of the molded food product that are drained by the heat treatment. Thus, a higher value of the heating yield (%) inhibits draining the moisture content, oil content, and the like to have juicy food texture. The water-holding property can also be evaluated by cutting a part of the molded food product to be molded into a certain shape, compressing the molded food product from both the sides with a certain pressure, and measuring an amount of the drained water to determine a compressive moisture content as an index. A lower compressive moisture content can determine a higher water-holding property. Furthermore, the binding property and the water-holding property can be evaluated with a sensory test with scoring on food texture of a target food by a plurality of trained panelists.

EXAMPLES

Hereinafter, the present invention will be described in detail by using Examples, but the scope of the present invention is not limited to Examples.

Example 1

(Preparation of Meat Grain Portion A)

Mixing 26.5 parts by mass of a powdery soybean protein, 1.0 part by mass of a powdery curdlan, 69 parts by mass of water, 2.8 parts by mass of a flavor seasoning, 0.2 parts by mass of a beef flavor, and 0.12 parts by mass of a pigment was performed to be stirred. The obtained mixture liquid was filled in a heat-resistant package, and then degassed with a degassing sealer to be sealed. The sealed package containing the mixture liquid was put in a steam heater (steam convection oven, manufactured by MARUZEN CO., LTD.) at 98° C. to be steam-heated for 20 minutes. After 20 minutes, the package was taken from the oven and cooled to room temperature. The obtained gel was cut with a food processor to prepare a meat grain portion A.

(Preparation of Binding Portion B)

Stirring and suspending 1.0 part by mass of a powdery curdlan and 77.85 parts by mass of water was performed to obtain an aqueous dispersion. Then, 12.5 parts by mass of a powdery soybean protein was added, and the mixture was further stirred. Next, 3.5 parts by mass of vegetable oil or fat was added to be stirred, and 0.6 parts by mass of table salt, 1.7 parts by mass of a taste-enhancing seasoning (yeast extract), 0.6 parts by mass of a spice mix, 0.1 parts by mass of a vegetable extract seasoning (onion-flavored), and 2.0 parts by mass of dark soy sauce were further added. The mixture was stirred to obtain a smooth paste composition. This was a binding portion B. This binding portion B corresponds to the composition for processing molded food products of the present invention.

(Preparation of Oil-or-Fat-Containing Curdlan Gel C)

Stirring and suspending 62 parts by mass of water and 5 parts by mass of a powdery curdlan was performed to obtain an aqueous dispersion. Into this aqueous dispersion, 30 parts by mass of vegetable oil or fat, 0.5 parts by mass of an emulsifier, 2.0 parts by mass of a processed starch, and 0.1 parts by mass of a beef flavor were added. The mixture was further sufficiently stirred to obtain an emulsion. The obtained emulsion was filled in a heat-resistant package, and then degassed with a degassing sealer to be sealed. The sealed package containing the emulsion was put in a steam heater (steam convection oven, manufactured by MARUZEN CO., LTD.) at 95° C. to be steam-heated for 30 minutes. After 30 minutes, the package was taken from the oven to obtain an oil-or-fat-containing curdlan gel. The obtained oil-or-fat-containing curdlan gel was crushed with a crushing machine to obtain an oil-or-fat-containing curdlan gel C.

(Preparation of Hamburger Steak-Like Food)

Into a food processor, 60 parts by mass of the meat grain portion A, 20 parts by mass of the binding portion B, and 20 parts by mass of the oil-or-fat-containing curdlan gel C were put to be stirred and mixed well. The mixture was molded into a shape of a hamburger steak, steam-heated with a steam heater (steam convection oven, manufactured by MARUZEN CO., LTD.) at 95° C. for 30 minutes, and the surface was grilled with a hot plate at 200° C. to obtain a hamburger steak-like food.

Comparative Example 1

A meat grain portion A' and a binding portion B' were prepared in the same manner as in Example 1 except that no curdlan was used. The amount of water used was increased by each amount of curdlan used. Mixing 60 parts by mass of the meat grain portion A', 20 parts by mass of the binding portion B', and 20 parts by mass of lard was well performed. The mixture was molded into a hamburger steak shape, and the same procedure as in Example 1 was performed to obtain a hamburger steak-like food.

The hamburger steak-like food prepared in Example 1 did not have a large difference in both appearance and food texture comparing with a hamburger steak prepared by using usual meat. In contrast, the hamburger steak-like food prepared in Comparative Example, which did not bind materials, had collapsed appearance, had no cohesiveness when eaten, and had completely difference in food texture comparing with the hamburger steak prepared by using usual meat.

Example 2

(Preparation of Binding Portion D)

Stirring and suspending 47.5 parts by mass of water and 10 parts by mass of a powdery curdlan was performed to obtain an aqueous dispersion. Into this aqueous dispersion, 40 parts by mass of vegetable oil or fat, 0.5 parts by mass of an emulsifier, and 2.0 parts by mass of a processed starch were added, and the mixture was further sufficiently stirred to obtain an emulsion. This was a binding portion D. This binding portion D corresponds to the composition for processing molded food products of the present invention.

(Preparation of Hamburger Steak)

Into a food processor, 10.84 parts by mass of the binding portion D, 55 parts by mass of combining-minced meat, 5 parts by mass of bread crumb, 5 parts by mass of water, 20 parts by mass of onion, 0.15 parts by mass of sodium glutamate, 0.8 parts by mass of sodium chloride, 0.2 parts by mass of black pepper, 0.01 parts by mass of nutmeg, and 3 parts by mass of a vegetable protein were put to be stirred and mixed well. The mixture was molded into a shape of a hamburger steak, both the surface were grilled with a hot plate at 200° C. for 1 minute on each surface, and steam-heated with a steam heater (steam convection oven, manufactured by MARUZEN CO., LTD.) at 220° C. for 10 minutes to obtain a hamburger steak.

Comparative Example 2

A hamburger steak was obtained in the same manner as in Example 2 except that the whole of the binding portion D was substituted with lard.

Example 3

(Preparation of Ham)

Into a food processor, 8.0 parts by mass of the binding portion D, 65.3 parts by mass of water, 0.4 parts by mass of sodium glutamate, 3.0 parts by mass of sodium chloride, 2.0 parts by mass of pig collagen, 2.0 parts by mass of lactalbumin, 0.5 parts by mass of sodium caseinate, 10.0 parts by mass of a starch, 4.0 parts by mass of a dried egg white, 4.0 parts by mass of a vegetable protein, and 100.0 parts by mass of minced shoulder of pork were put to be stirred and mixed well. The mixture was molded and stored overnight in a refrigerator (5° C. or lower). After the storage, the molded product was boiled in water at 80° C. for 30 minutes and cooled overnight in a refrigerator to obtain ham.

Comparative Example 3

Ham was obtained in the same manner as in Example 3 except that the whole of the binding portion D was substituted with water.

(Heating Yield)

Mass a, which was a mass when the mixture was molded in a shape of a hamburger steak, and Mass b, which was a mass after the heating, were measured in Example 2 and Comparative Example 2. Mass a, which was a mass after the storage in a refrigerator and before the boiling, and Mass b, which was a mass after the storage in a refrigerator after the boiling, were measured in Example 3 and Comparative Example 3. A heating yield was determined with the following formula. Table 1 and Table 2 show the results.

$$\text{Heating Yield } (\%) = b/a \times 100$$

TABLE 1

| | Example 2 | Comparative Example 2 |
|---|---|---|
| Heating yield (%) | 86.5 | 78.7 |

TABLE 2

| | Example 3 | Comparative Example 3 |
|---|---|---|
| Heating yield (%) | 93.5 | 90.7 |

A heating yield of the hamburger steak obtained in Example 2 and a heating yield of the ham obtained in Example 3 are larger value than that of the hamburger steak obtained in Comparative Example 2 and that of the ham obtained in Comparative Example 3. Use of the composition of the present invention has been found to improve the water-holding property of the molded food products.

(Evaluation of Physical Properties)

On the ham obtained in Example 3 and Comparative Example 3, a rupture stress and a rupture strain were measured by using a rheometer (RHEONER 2 CREEP METER RE2-3305B, manufactured by YAMADEN co., ltd.) under conditions of a measuring strain: 90%, a measuring rate: 1 mm/second, a sample thickness: 20 mm, and a plunger diameter: 8 mm. Table 3 shows the result.

TABLE 3

| | Example 3 | Comparative Example 3 |
|---|---|---|
| Rupture stress (N/cm$^2$) | 14.1 | 13.5 |
| Rupture strain (%) | 55.4 | 41.9 |

It is found that the ham obtained in Example 3 is excellent in the rupture stress and the rupture strain comparing with the ham obtained in Comparative Example 3. Accordingly, use of the processing composition of the present invention has been found to improve the binding property of the molded food products.

Example 4

(Production of Sliced Salmon-Style Food)

Hereinafter, separately described are preparation of an aqueous dispersion E for producing a salmon pink portion, preparation of a powder F for producing a fiber, production of salmon-style sliced fish for a sliced salmon-style food using them, and production of a sliced salmon-style food.

(Preparation of Aqueous Dispersion E for Producing Salmon Pink Portion)

Mixing 49 parts by mass of water and 2.8 parts by mass of a powdery curdlan was performed with a high-speed stirrer to obtain an aqueous dispersion. Into the obtained aqueous dispersion, with high-speed stirring, an aqueous solution of 0.5 parts by mass of trisodium phosphate (anhydrous) in 29 parts by mass of water was added to dissolve the curdlan. Then, 0.6 parts by mass of a 50 mass % aqueous solution of fermented lactic acid was added for adjusting a pH to be 7.3 to obtain a uniform aqueous dispersion of the curdlan. Adding 2.5 parts by mass of a cellulose powder (90% or more thereof had a size of 100 mesh pass), 3.0 parts by mass of a processed starch, 0.7 parts by mass of dextrin, 0.3 parts by mass of table salt, 0.5 parts by mass of soy sauce, 0.45 parts by mass of a marine product extract seasoning, 0.45 parts by mass of pigments (a capsicum pigment, a tomato pigment, and a pigment of bamboo charcoal color), 10.0 parts by mass of salad oil, and 0.23 parts by mass of an emulsifier was performed. The mixture was well stirred and mixed at high speed to be an aqueous dispersion E for producing a salmon pink portion. This aqueous dispersion E for producing a salmon pink portion corresponds to the composition for processing molded food products of the present invention.

(Preparation of Powder F for Producing Fiber)

Mixing 20 parts by mass of a powdery curdlan, 10 parts by mass of a powdery calcium carbonate (white pigment), and 70 parts by mass of a powdery dextrin was well performed to prepare a powder F for producing a fiber.

(Production of Salmon-Style Slice for Sliced Salmon-Style Food)

The aqueous dispersion E for producing a salmon pink portion prepared as above was poured into a heat-resistant mold, the powder F for producing a fiber portion prepared as above was spread over the whole surface, and further, the aqueous dispersion E for producing a salmon pink portion was poured thereon. This procedure was repeated a plurality of times to prepare a multilayer body in which a plurality of layers of the aqueous dispersion E for producing a salmon pink portion and the powder F for producing a fiber were alternately stacked in the heat-resistant mold. The heat-resistant mold in which the multilayer body was prepared was degassed with a degassing sealer to be sealed, and put in a steam heater (steam convection oven, manufactured by MARUZEN CO., LTD.) at 95° C. to be steam-heated for 40 minutes. After 40 minutes, the mold was taken from the oven and cooled to room temperature to prepare a salmon-style slice for a sliced salmon-style food. Further, this was rapidly frozen to −40° C. and stored in a freezer for two months.

(Production of Sliced Salmon-Style Food)

The salmon-style slice obtained as above and stored in a freezer was thawed at room temperature, and then cut in a presuming size and shape of usual sliced salmon in a direction perpendicular to the layered salmon pink portions and fibers to be a sliced salmon-style food.

(Evaluation of Appearance)

Observed were portions corresponding to meat of salmon pink in salmon and white layers corresponding to fibers of fatty salmon, and a plurality of layers thereof that were alternately laminated. The appearance was impressed as a sliced fatty salmon (see FIG. 1). Even when the food was lifted in a state of being sliced fish, the salmon pink portion and the fiber portion were not separated but adhered.

Example 5

(Production of Bacon-Style Food)

Hereinafter, a method for producing a bacon-style food will be described separately into preparation of an aqueous dispersion G for producing lean meat, preparation of an aqueous dispersion H for producing fat, and a production of a bacon-style food using them.

(Preparation of Aqueous Dispersion G for Producing Lean Meat)

Mixing 46 parts by mass of water and 2.8 parts by mass of a powdery curdlan was performed with a high-speed stirrer to obtain an aqueous dispersion. Into the obtained aqueous dispersion, with high-speed stirred, an aqueous solution of 0.5 parts by mass of trisodium phosphate (anhydrous) in 29 parts by mass of water was added to dissolve the curdlan. Then, 0.6 parts by mass of a 50 mass % aqueous solution of fermented lactic acid was added for adjusting a pH to be 7.3 to obtain a uniform aqueous dispersion of the curdlan. Adding 2.5 parts by mass of a cellulose powder (90% or more thereof had a size of 100 mesh pass), 3.0 parts by mass of a processed starch, 0.7 parts by mass of dextrin, 2.0 parts by mass of a powdery soybean protein, 1.0 part by mass of table salt, 0.5 parts by mass of soy sauce, 0.4 parts by mass of a taste-enhancing seasoning, 0.5 parts by mass of aroma (a charcoal grilling flavor or a bacon flavor), 0.01 parts by mass of a pigment, 10.0 parts by mass of salad oil, and 0.23 parts by mass of an emulsifier was performed. The mixture was well stirred and mixed at high speed to prepare an aqueous dispersion G for producing lean meat. This aqueous dispersion G for producing lean meat corresponds to the composition for processing molded food products of the present invention.

(Preparation of Aqueous Dispersion H for Producing Fat)

Suspending 89 parts by mass of water and 5 parts by mass of a powdery curdlan was performed with a high-speed stirrer to obtain an aqueous dispersion. Into this aqueous dispersion, 2.0 parts by mass of calcium carbonate (white pigment), 2.0 parts by mass of salad oil, and 2.0 parts by mass of a processed starch were added. The mixture was further sufficiently stirred at high speed to prepare an aqueous dispersion H for producing fat. This aqueous dispersion H for producing fat corresponds to the composition for processing molded food products of the present invention.

(Production of Bacon-Style Food)

The aqueous dispersion G for producing lean meat was poured into a heat-resistant mold, the aqueous dispersion H for producing fat was poured on the aqueous dispersion G for producing lean meat, and further, the aqueous dispersion G for producing lean meat was poured thereon. This procedure was repeated a plurality of times to prepare a multilayer body in which a plurality of layers of the aqueous dispersion G for producing lean meat and the aqueous dispersion H for producing fat were alternately stacked in the heat-resistant mold. The heat-resistant mold in which the multilayer body was prepared was degassed with a degassing sealer to be sealed, and put in a steam heater (steam convection oven, manufactured by MARUZEN CO., LTD.) at 95° C. to be steam-heated for 40 minutes. After 40 minutes, the mold was taken from the oven and cooled to room temperature to prepare a lump bacon-style food. Further, this was rapidly frozen to −40° C. and stored in a freezer for two months.

The lump bacon-style food stored in a freezer was thawed at room temperature, and then sliced in a direction perpendicular to the layered lean meat and fat. The slice was evaluated as a sample.

(Evaluation of Appearance)

The lean meat portion and the fat portion were layered, and the appearance was impressed as a slice of bacon (see FIG. 2). Even when the food was lifted in a state of being sliced, the lean meat portion and the fat portion were not separated but adhered.

(Sensory Evaluation)

Several sensory panelists (adult healthy individuals who were not vegetarians nor vegans and who had ordinary diet) tasted the sample, and obtained evaluation was food texture and taste similar to those of genuine bacon.

INDUSTRIAL APPLICABILITY

Use of the composition for processing molded food products of the present invention can produce molded food products having excellent binding property and water-holding property without necessarily use of a phosphate salt or egg white. Therefore, the composition for processing molded food products is industrially applicable in the food field.

The invention claimed is:

1. A method for producing a multilayer body-molded food product which is a meat-like food or a fish-meat-like food, the method comprising the steps of:

(1) molding a layer 1 by pouring into a mold a raw material for a molded food product comprising: a composition for processing the molded food product, the composition comprising an aqueous dispersion or hydrosol of a thermocoagulable β-1,3-glucan and an oil or fat; and a food material, (2) molding a layer 2 by spreading thermocoagulable β-1,3-glucan powder over the layer 1;

(3) repeating the prior steps to thereby form a multilayer body consisting of a plurality of layers comprising the layer 1 formed by the raw material for a molded food product, and the layer 2; and (4) heat-treating of the multilayer body.

2. The method for preparing a multilayer body-molded food product according to claim 1, wherein the aqueous dispersion or the hydrosol further comprises one or more materials selected from the group consisting of a starch, an emulsifier, a powdery protein material, a cellulose, a calcium salt, a pigment, and a thickener.

* * * * *